United States Patent
Wiggs

(10) Patent No.: US 10,655,923 B1
(45) Date of Patent: May 19, 2020

(54) SPECIAL COOLING COATING DESIGN FOR FOSSIL FUEL, NUCLEAR, GEOTHERMAL, AND SOLAR HEAT DRIVEN POWER PLANTS; FOR HVAC COOLING APPLICATIONS; AND FOR HEAT REJECTION SYSTEMS

(71) Applicant: Deep Well Power, LLC, Franklin, TN (US)

(72) Inventor: B. Ryland Wiggs, Franklin, TN (US)

(73) Assignee: Deep Well Power, LLC, Franklin, TN (US)

( * ) Notice: Subject to any disclaimer, the term of this patent is extended or adjusted under 35 U.S.C. 154(b) by 252 days.

(21) Appl. No.: 15/795,889

(22) Filed: Oct. 27, 2017

Related U.S. Application Data

(60) Provisional application No. 62/496,787, filed on Oct. 28, 2016.

(51) Int. Cl.

| | | |
|---|---|---|
| *F28F 13/18* | (2006.01) | |
| *F16L 9/14* | (2006.01) | |
| *C09D 5/26* | (2006.01) | |
| *F28D 21/00* | (2006.01) | |
| *B05D 5/00* | (2006.01) | |
| *F28F 21/04* | (2006.01) | |

(52) U.S. Cl.
CPC .............. *F28F 13/182* (2013.01); *B05D 5/00* (2013.01); *C09D 5/26* (2013.01); *F16L 9/14* (2013.01); *F28D 21/00* (2013.01); *F28F 21/04* (2013.01); *F28D 2021/0059* (2013.01); *F28D 2021/0061* (2013.01); *F28D 2021/0068* (2013.01)

(58) Field of Classification Search
CPC .......... F28F 13/182; F28F 21/04; B05D 5/00; C09D 5/26; F16L 9/14; F28D 21/00; F28D 2021/0059; F28D 2021/0061; F28D 2021/0068
USPC ........................................ 165/133, DIG. 512
See application file for complete search history.

(56) References Cited

U.S. PATENT DOCUMENTS

| | | | | |
|---|---|---|---|---|
| 4,072,530 A * | 2/1978 | Hirame | ................ | C04B 35/565 106/632 |
| 4,354,096 A * | 10/1982 | Dumas | ................ | A01K 63/065 219/504 |
| 4,668,298 A * | 5/1987 | Funahashi | ................ | H05B 7/12 106/286.8 |
| 5,419,135 A * | 5/1995 | Wiggs | ..................... | F02G 1/043 60/641.15 |
| 6,971,248 B1 * | 12/2005 | Wiggs | ..................... | F25D 21/04 165/47 |
| 2009/0252660 A1 * | 10/2009 | Olver | ....................... | C10G 9/20 422/600 |
| 2010/0038061 A1 * | 2/2010 | Olver | .................... | F22B 37/107 165/134.1 |

(Continued)

*Primary Examiner* — Justin M Jonaitis
(74) *Attorney, Agent, or Firm* — Miller, Matthias & Hull LLP

(57) ABSTRACT

At least one of a heat-driven power generation system, an HVAC system, a system requiring heat rejection from its working fluid, and any object where cooling is advantageous where the portion of at least one of the exterior working fluid containment tubing and the exterior surface area exposed to air that is used for heat rejection is coated with a special coating designed to enhance heat rejection to the exterior air and/or space with minimal interference from air molecules in the earth's atmosphere.

20 Claims, 2 Drawing Sheets

(56) References Cited

U.S. PATENT DOCUMENTS

2013/0327509 A1\* 12/2013 Michitsuji ............... F24F 13/30
                                                                                 165/172
2017/0137722 A1\* 5/2017 Petela .................... C10G 9/203

\* cited by examiner

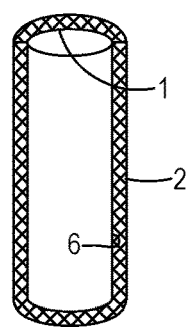
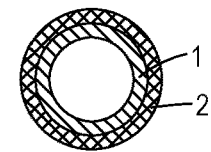
FIG. 1  FIG. 2
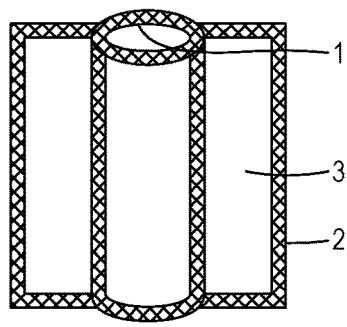
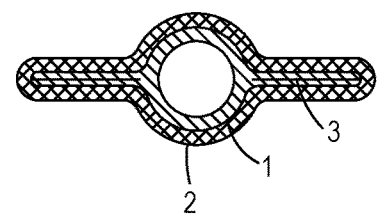
FIG. 3  FIG. 4
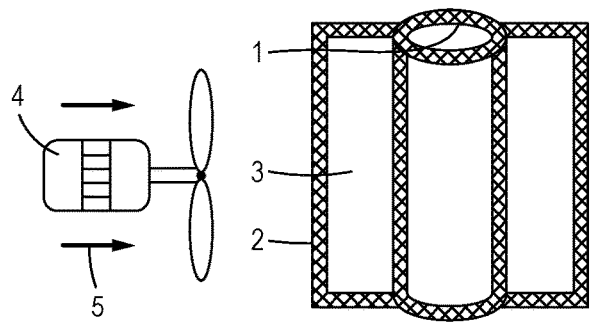
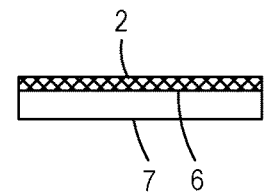
FIG. 5  FIG. 6

SPECIAL COOLING COATING DESIGN FOR FOSSIL FUEL, NUCLEAR, GEOTHERMAL, AND SOLAR HEAT DRIVEN POWER PLANTS; FOR HVAC COOLING APPLICATIONS; AND FOR HEAT REJECTION SYSTEMS

FIELD OF THE DISCLOSURE

The present disclosure relates to methods and apparatus for cooling and/or condensing fluids in fossil fuel, nuclear, geothermal, and solar heat-driven power plants, and/or in heating, ventilating, and air conditioning (HVAC) cooling applications, and/or in heat rejection systems.

BACKGROUND OF THE DISCLOSURE

Most traditional fossil fuel, nuclear, and solar heat-driven power plants typically utilize water (R-718) as a primary phase change working fluid for cooling purposes. In HVAC applications, a refrigerant, such as R-410A, R134A, R744 CO2, or the like, is typically utilized as a phase change working fluid for cooling purposes. Typically, at least one of water and a refrigerant is utilized as the working fluid in other types of heat rejection systems operating with a working fluid, although simple heat rejection may sometimes be accomplished through a flat plate, or the like.

Water is readily available and inexpensive, and has therefore been traditionally utilized in such heat-driven power generation facilities, where relatively large amounts of water are required in the primary working fluid closed-loop. Typically, the water is pumped into and through a boiler, where the water is vaporized and superheated to a high pressure. The high-pressure steam may power one or more turbine/generators which extract mechanical energy from the steam, thereby reducing the pressure and temperature of the steam. Some of the hot steam is typically used to pre-heat water returned to the boiler, while the remaining steam is cooled and condensed back into a liquid. Some or all of the condensed water may be pumped back to the boiler to repeat the cycle.

With water as the working fluid in the primary power generation closed-loop portion of the power plant, under normal atmospheric pressures (1 bar, or about 14.5038 psi) as an example, about 970.4 BTUs are required to phase change one pound of water into steam, and the same approximate 970.4 BTUs are required to phase change the steam back into one pound of liquid water. Energy is required to effect the two respective phase changes, but the temperature of the water is not materially affected during the change in phase. Rather, during a change in phase, typically only the state of the water (i.e., liquid or vapor form) is affected. Once the working fluid is in a water only state/phase, however, only 1 BTU per pound of water under normal atmospheric pressures is needed to change (i.e., increase or decrease) the temperature of the water by 1 degree F.

Consequently, to solely effect the two necessary phase changes of water (water into a vapor/steam and steam into water), if operating under normal atmospheric pressures, about 1,940.8 BTUs of energy must be provided per one pound of water.

Refrigerants other than water may be used as the primary phase change working fluid in common HVAC heating and cooling applications (as well as in some geothermal power production systems, in some solar heat power production systems, in some waste heat power production systems, in other various types of heat-driven power production systems, and the like). In such non-water refrigerant working fluid applications, working fluid phase change temperatures, at the same normal atmospheric pressure for example, typically require less BTUs than water to effect a phase change, which may be advantageous for a particular application.

However, regardless of the working fluid utilized in power production or cooling applications, generally, about the same amount of BTU energy required to vaporize the working fluid utilized is also required to condense the same working fluid back into a liquid state. Condensing and liquefying a working fluid is effected by removing heat from the vapor phase working fluid. After the BTU energy necessary to condense the working fluid is supplied, far less BTU energy is then needed per pound to subsequently cool the liquefied refrigerant working fluid below it's condensation point (herein referred to as sub-cooling). For example, under normal atmospheric pressures, it takes about 970.4 BTUs to condense 1 pound of water, but then it only takes about 1 BTU to further cool the same 1 pound of water per 1 degree F.

Cooling work for phase changing and for sub-cooling a working fluid to temperatures below the working fluid's condensation point requires the expenditure of BTU energy. Such cooling work is typically provided by exchanging heat from the primary hot working fluid with at least one of cooler air, with a separate cooler water source (such as a river, a lake, well water, ocean water, or the like); with another cooler working fluid (such as a refrigerant to water heat exchanger in a geothermal water-source heat pump system); and/or with an evaporative cooling system, where water is typically sprayed onto a hotter working fluid container/pipe where the cooler water absorbs and removes enough BTUs from the primary working fluid to evaporate the sprayed on water. Heat is naturally transferred from a warmer working fluid to a cooler surrounding environment via Fourier's Law, as heat naturally travels to cold.

While in most power production systems, attention is generally primarily afforded to a cost-effective way to provide heat to vaporize and raise the temperature of the primary working fluid to a desirable level (raising the temperature above the vaporization point is herein referred to as superheating), it is also very important to provide a cost-effective and environmentally friendly way to condense and sub-cool the primary working fluid to a desirable level. Generally, for example, the cooler the closed-loop working fluid in a power plant, the greater the temperature differentials and the greater the amount of power that can be generated. Similarly, generally in an HVAC application, the greater the closed-loop working fluid temperature differentials, the greater the amount of cooling work that can be provided.

Traditional power plant cooling methods can have adverse environmental impacts. For example, using river and/or lake water to condense and/or sub-cool the closed-loop water working fluid in large power plants in the summer can result in the river and/or lake water becoming so warm that it kills native fish and/or other aquatic life, or in becoming so warm so that it enhances the quantity of zebra muscles, which can clog up fresh water intakes, or the like. Also, as another example, vaporized salt water from seawater-cooled power plants can impair vegetation and/or farmland for miles around such a power production facility. Further, as natural river and/or lake water naturally heats up in the summer, power plant operational temperature differentials deteriorate and power production abilities decrease.

Instead of using an exterior water source to cool closed-loop water working fluid in a power plant, as an example, condensing and/or cooling the primary closed-loop water working fluid with air can be expensive, requiring large arrays of finned tubing, or the like, often with parasitic power-consuming fans so as to increase airflow and the cooling effect. Also, as outdoor air temperatures rise during the summer (just as with rising natural water temperatures when water is used for cooling), decreases in the primary working fluid temperature differentials result, and cooling abilities correspondingly disadvantageously decrease. This, in turn, results in more cooling equipment and/or more fan power being required, and/or in lower than optimum design power output. When design levels of working fluid cooling cannot be attained, normal operational design levels of power production in power plants, and normal operational design levels of cooling abilities in HVAC systems, typically cannot be supplied.

SUMMARY OF THE DISCLOSURE

In view of the foregoing, it would be advantageous to provide cooling means that at least one of decreases condensing and/or cooling equipment and/or energy requirements, and increases cooling equipment efficiencies, as well as having a positive impact on the environment.

The ability to provide at least one of an actual economic, an efficiency, and an environmentally friendly cooling advantage would be afforded by coating the exterior of heat exchange tubing (such as metal tubing, plastic tubing, finned tubing, micro-channels, or the like) used to transport a working fluid, thereby enhancing the exchange of heat from the working fluid inside the heat exchange tubing to the ambient environment surrounding the heat exchange tubing. The coating may be a silicon carbide and silicon dioxide coating, or the like, designed to release heat radiation in wavelengths of between about 7.9 and 13.0 micrometers. This coating enhances rejection of heat into surrounding space with minimal interference from air molecules in the earth's atmosphere, thereby increasing the overall cooling efficiency of at least one of a power production system, an HVAC cooling system, and most any other cooling system utilizing heat rejection to air.

The coating disclosed herein significantly enhances heat transfer from a cooling system's primary working fluid as unwanted heat travels through piping/tubing, or the like, containment walls, through the special coating, and then to the exterior air and/or space, and will thereby increase cooling system operational efficiencies, while simultaneously reducing potential adverse environmental impacts otherwise caused by increased cooling work.

In fact, coating the exterior heat exchange tubing of a refrigerant to air heat exchanger with a silicon carbide and silicon dioxide coating, or the like, designed to release heat radiation in wavelengths of between about 7.9 and 13.0 micrometers will enhance the operational efficiencies of most any type of power production system, and of any most any type of HVAC heat pump system operating in the cooling mode, since, as said, the said special coating will effectively serve to enhance the rejection of heat into space with minimal interference from air molecules.

This heat rejection method is so efficient that it may be preferable to utilize such a heat rejection method over that of conventional water-cooled power plant system designs, and/or over that of conventional geothermal cooling systems, and/or over that of conventional evaporative cooling/chiller systems, especially as the use and/or evaporation of very large quantities of water (particularly fresh water) by power plants and/or by large evaporative chillers, can create multiple negative issues. For example, it has been reported that the use of evaporative chillers, besides requiring large water and chemical treatment expenditures, can even enhance the potential for Legionnaire's Disease.

The application of such a special coating on the exterior of at least one of new and used/existing working fluid to air heat exchange tubing and/or equipment (such as finned tubing, micro-channels, plate heat exchangers, and the like) may effectively reduce the size (and initial cost) of traditional cooling equipment, reduce the requirements for fan enhanced airflow (with its higher operational costs), increase overall system operational efficiencies, and reduce initial and/or on-going operation costs, all while having a positive environmental impact.

Therefore, it is preferable to have a heat-driven power generation system of any design where there is at least one of phase change working fluid transport tubing and non-phase change working fluid transport tubing, which has exterior working fluid to air heat exchange tubing that is coated with a special silicon carbide and silicon dioxide coating, or the like, designed to release heat radiation in wavelengths of between about 7.9 and 13.0 micrometers. Such a heat-driven power generation system may optionally have working fluid transport tubing of any size and shape.

It is also preferable to have a cooling mode HVAC system of any design where there is at least one of phase change working fluid transport tubing and non-phase change working fluid transport tubing, which has exterior refrigerant to air heat exchange tubing that is coated with a special silicon carbide and silicon dioxide coating, or the like, designed to release heat radiation in wavelengths of between about 7.9 and 13.0 micrometers. Such an HVAC system may optionally have working fluid transport tubing of any size and shape.

Further, for any system requiring heat rejection from its working fluid, and/or for any object where heat rejection is advantageous, it is preferable for the portion of the exterior working fluid containment tubing and/or for the exterior surface area of any object used for heat rejection to be coated with a special coating comprised of a silicon carbide and silicon dioxide coating, or the like, designed to release heat radiation in wavelengths of between about 7.9 and 13 micrometers, to minimize interference with air molecules in the earth's atmosphere and to enhance heat rejection into space. In such any system, the working fluid transport tubing and/or the heat rejection surface area to be coated with the special coating may be of any size and shape.

Thus, it is advantageous for the provision of a method of forming a special exterior surface area coating for the surface of any object where cooling is desired, which special coating is comprised of a silicon carbide and silicon dioxide coating, or the like, designed to release heat radiation in wavelengths of between about 7.9 and 13.0 micrometers, to minimize interference with air molecules in the earth's atmosphere and to enhance heat rejection into space. Alternatively, the special coating may be comprised of any element(s) that release heat radiation in wavelengths of between about 7.9 and 13.0 micrometers.

In all of the above applications where the use of the special coating is disclosed, a fan may preferably be utilized to increase the airflow rate across the working fluid containment tubing, the heat rejection surface area, or the like, with the said special coating utilized for heat transfer to the exterior air and/or space.

BRIEF DESCRIPTION OF THE DRAWINGS

FIG. 1 is a side view of a working fluid containment tube surrounded by the special coating described herein.

FIG. 2 is a top view of the working fluid containment tube of FIG. 1, surrounded by the special coating described herein.

FIG. 3 is a side view of an alternative embodiment of a working fluid containment tube having fins, surrounded by the special coating described herein.

FIG. 4 is a top view of the finned working fluid containment tube of FIG. 3, surrounded by the special coating described herein.

FIG. 5 is a side view of an alternative embodiment, showing a finned working fluid containment tube surrounded by the special coating described herein, together with a fan augmenting airflow across the finned working fluid containment tube.

FIG. 6 is a side view of an alternative embodiment, showing a flat heat rejection surface area having an exterior side coated with the special coating described herein.

DETAILED DESCRIPTION

Figure 7:
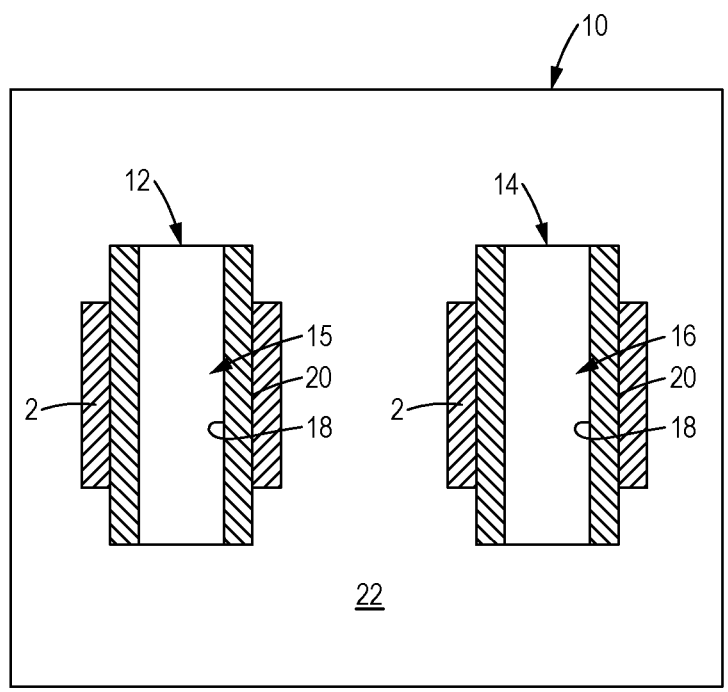
FIG. 7 is a schematic diagram of a system using heat rejection having at least one working fluid containment tubing with the special coating described herein.

The following detailed description is of the best presently contemplated mode of carrying out the subject matter disclosed herein. The description is not intended in a limiting sense, and is made solely for the purpose of illustrating the general principles of this subject matter. The various features and advantages of the present disclosure, none of which are drawn to scale, may be more readily understood with reference to the following detailed description taken in conjunction with the accompanying drawings.

Referring now to the drawings in detail, where like numerals refer to like parts or elements, there is shown in FIG. 1 a side view, not drawn to any scale, of a working fluid containment tube 1 surrounded by and/or coated with the special coating 2 described herein. The special coating 2 is comprised of a silicon carbide and silicon dioxide coating, or the like, designed to release heat radiation in wavelengths of between about 7.9 and 13.0 micrometers. The special coating 2 significantly enhances heat transfer from a working fluid passing through an interior of the containment tube 1. As heat naturally flows to cold (Fourier's Law), heat will travel from the warmer working fluid through the wall of the working fluid containment tube 1 to the exterior surface 6 of the working fluid containment tube 1. Next, the heat will travel through the special coating 2, applied to the exterior surface 6 of the working fluid containment tube 1, and then to the exterior air and/or space in the ambient environment surrounding the containment tube 1, all with minimal interference from air molecules in the earth's atmosphere, and thereby at least one of increasing any cooling system's operational efficiencies and decreasing at least one of any cooling system's initial costs and on-going operational costs, all in addition to providing positive environmental impacts.

As only one example illustrated at FIG. 7, a system using heat rejection, such as a power production plant 10, may include a phase change working fluid transport tubing 12 and a non-phase change working fluid transport tubing 14. Each of the phase change and non-phase change working fluid transport tubing 12, 14 may have a heat exchange section 15, 16. Alternatively, only one of the phase change working fluid transport tubing 12 or the non-phase change working fluid transport tubing 14 may have a heat exchange section 15 or 16. The heat exchange section 15 or 16 has an interior surface 18, through which the working fluid flows, and an exterior surface 20 surrounding by an ambient environment 22. The special coating 2 is disposed on at least one of the exterior surfaces 20 and is configured to release heat radiation in wavelengths of between about 7.9 and about 13.0 micrometers. By increasing the operational efficiencies of the power production plant 10, via the provision of greater primary closed-loop working fluid operational temperature differentials occasioned by enhanced cooling abilities via utilization of the special coating 2, more power can be provided than otherwise possible during warmer outdoor conditions. Such additional power is provided absent the need for additional fuel expenditures, and therefore absent the otherwise resulting additional amounts of carbon dioxide ($CO_2$, which is considered to be an environmentally harmful greenhouse gas) emissions from fossil fuel plants, which is a very positive environmental impact. As also explained, via utilizing the special coating 2 to cool any heat-driven power plant and/or to cool any HVAC system's primary closed-loop working fluid, at least one of operational power requirements can be reduced and water cooling requirements can be at least one of reduced and eliminated, thereby providing additional positive environmental impacts.

The working fluid to air heat exchanger's heat exchange containment tubing 1, the phase change working fluid transport tubing 12, and/or the non-phase change working fluid transport tubing 14 may be comprised of at least one of metal tubing, plastic tubing, finned tubing, micro-channels, plate heat exchange material, or the like. Also, while only round heat exchange tubing is shown herein as an example, and while only heat exchange tubing 1 with fins 3 is shown as examples in FIGS. 3-5, the heat exchange tubing may be of any size and shape, inclusive of a flat surface.

The working fluid to air heat exchanger's heat exchange containment tubing 1 may be utilized to transport at least one of a liquid phase working fluid and a vapor phase working fluid.

The special coating 2 is effective and useful for enhancing heat transfer out of any phase change working fluid. The said special coating 2 is also effective and useful for enhancing heat transfer out of at least one of non-phase change liquid phase working fluid and a non-phase change vapor phase working fluid, for elimination of heat content purposes (when there is no working fluid phase change design or requirement).

Thus, in at least one of a heat-driven power generation system, an HVAC system, and a system requiring heat rejection from its working fluid, it is preferable to coat the portion of the exterior working fluid containment tubing 1 used for heat rejection with the said special coating 2 designed to enhance heat rejection to the exterior air and/or space with minimal interference from air molecules in the earth's atmosphere. Such a special coating 2, as explained, would be comprised of a silicon carbide and silicon dioxide coating, or the like, designed to release heat radiation in wavelengths of between about 7.9 and about 13.0 micrometers.

Additionally, in all of the above applications where the use of the special coating 2 is disclosed, a fan 4 (FIG. 5) may be provided and oriented to increase the rate of airflow 5 across the working fluid containment tubing 1, or the like, utilized for heat transfer to the exterior air and space.

FIG. 2 is a top view of a working fluid containment tube 1 surrounded by the special coating 2 described herein.

FIG. 3 is a side view of a working fluid containment tube 1, with fins 3 attached, all surrounded by the special coating 2 described herein. While two fins 3 are shown herein as an example, any number of fins 3 may be attached to the working fluid containment tube 1, all of which attached fins 3 should preferably be coated with the special coating 2 described herein.

FIG. 4 is a top view of a working fluid containment tube 1, with fins 3 attached, all surrounded by the special coating 2 described herein.

FIG. 5 is a side view of a working fluid containment tube 1, with fins 3 attached, all surrounded by the special coating 2 described herein, together with a fan 4 augmenting airflow 5 (air is not shown, but is indicated by a directional arrow 5) across the finned 3 working fluid containment tube 1. Although not shown herein, as is well understood by those skilled in the art, natural exterior air draft designs may optionally be utilized to augment airflow 5 over working fluid transport tubing 1 with fins 2, or the like. In such a natural exterior air draft heat transfer augmentation design, coating the exterior working fluid heat exchange tubing 1, whether or not finned 3, with the said special coating 2 is also preferable and advantageous.

However, in all of the applications where the use of the special coating 2 is herein disclosed, a fan 4 may preferably be utilized to increase the rate of airflow 5 across the working fluid containment tubing 1, or the like, with the special coating 2 utilized for heat transfer to the exterior air and space. The use of a fan 4 will typically advantageously increase the convective heat transfer rate and rate of heat rejection.

FIG. 6 is a side view of a flat heat rejection area 7 with it's exterior surface 6 side exposed to the air having been coated with the special coating 2 described herein.

What is claimed is:

1. A heat-driven power generation system using a working fluid, comprising:
    a working fluid to air heat exchange section of a working fluid transport tubing, the working fluid to air heat exchange section having an interior surface, through which the working fluid flows, and an exterior surface; and
    a special coating disposed on the exterior surface and configured to release heat radiation in wavelengths of between about 7.9 and about 13.0 micrometers.

2. The heat-driven power generation system of claim 1, in which the special coating comprises silicon carbide and silicon dioxide.

3. The heat-driven power generation system of claim 1, in which the working fluid transport tubing comprises a phase change working fluid transport tubing.

4. The heat-driven power generation system of claim 1, in which the working fluid transport tubing comprises a non-phase change working fluid transport tubing.

5. The heat-driven power generation system of claim 1, in which the working fluid transport tubing has a cylindrical shape.

6. The heat-driven power generation system of claim 1, further comprising a fan oriented to direct air flow across the exterior surface.

7. A cooling mode HVAC system using a working fluid, comprising:
    a refrigerant to air heat exchange section of a working fluid transport tubing, the refrigerant to air heat exchange section having an interior surface, through which the working fluid flows, and an exterior surface; and
    a special coating disposed on the exterior surface and configured to release heat radiation in wavelengths of between about 7.9 and about 13.0 micrometers.

8. The cooling mode HVAC system of claim 7, in which the special coating comprises silicon carbide and silicon dioxide.

9. The cooling mode HVAC system of claim 7, in which the working fluid transport tubing comprises a phase change working fluid transport tubing.

10. The cooling mode HVAC system of claim 7, in which the working fluid transport tubing comprises a non-phase change working fluid transport tubing.

11. The cooling mode HVAC system of claim 7, in which the working fluid transport tubing has a cylindrical shape.

12. The cooling mode HVAC system of claim 7, further comprising a fan oriented to direct air flow across the exterior surface.

13. A system for rejecting heat from a working fluid, comprising:
    a working fluid containment tube having an interior surface, through which the working fluid flows, and an exterior surface; and
    a special coating disposed on the exterior surface and configured to release heat radiation in wavelengths of between about 7.9 and about 13.0 micrometers.

14. The system of claim 13, in which the special coating comprises silicon carbide and silicon dioxide.

15. The system of claim 13, in which the working fluid containment tube comprises a phase change working fluid containment tube.

16. The system of claim 13, in which the working fluid containment tube comprises a non-phase change working fluid containment tube.

17. The system of claim 13, in which the working fluid containment tube has a cylindrical shape.

18. The system of claim 13, further comprising a fan oriented to direct air flow across the exterior surface.

19. A method of improving exchange of heat from an interior of a heat exchange tubing to an ambient environment surrounding an exterior of the tubing, the method comprising:
    transporting a working fluid through the heat exchange tubing, the working fluid having a working fluid temperature that is higher than a temperature of the ambient environment; and
    configuring the exterior surface of the heat exchange tubing to release heat radiation in wavelengths of between about 7.9 and about 13.0 micrometers.

20. The method of claim 19, in which configuring the exterior surface comprises coating the exterior surface with a special coating comprising a silicon carbide and a silicon dioxide that is configured to release heat radiation in wavelengths of between about 7.9 and about 13.0 micrometers.

* * * * *